(12) United States Patent
Tamura et al.

(10) Patent No.: US 6,532,733 B1
(45) Date of Patent: Mar. 18, 2003

(54) PLASMA EXHAUST GAS TREATMENT DEVICE

(75) Inventors: Yasuki Tamura, Nisshin (JP); Osamu Nakayama, Toyota (JP); Kazuo Koga, Okazaki (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 09/692,936

(22) Filed: Oct. 20, 2000

(30) Foreign Application Priority Data

Oct. 20, 1999 (JP) ............................................ 11-297726

(51) Int. Cl.[7] ................................................ F01N 3/00
(52) U.S. Cl. .......................................... 60/275; 204/164
(58) Field of Search ................... 60/275, 272; 204/164, 204/169, 177; 422/186.04

(56) References Cited

U.S. PATENT DOCUMENTS

| | | | | |
|---|---|---|---|---|
| 5,236,672 A | * | 8/1993 | Nunez et al. | 422/186.04 |
| 5,452,576 A | * | 9/1995 | Hamburg et al. | 60/276 |
| 5,670,949 A | * | 9/1997 | Kirby et al. | 73/23.31 |
| 5,807,466 A | * | 9/1998 | Wang et al. | 204/177 |
| 5,827,407 A | * | 10/1998 | Wang et al. | 204/164 |
| 5,906,715 A | * | 5/1999 | Williamson et al. | 204/164 |
| 5,970,706 A | * | 10/1999 | Williamson et al. | 60/275 |

FOREIGN PATENT DOCUMENTS

JP          5-59934        3/1993

* cited by examiner

Primary Examiner—Thomas Denion
Assistant Examiner—Diem Tran
(74) Attorney, Agent, or Firm—Rossi & Associates

(57) ABSTRACT

A plasma exhaust gas treatment device of the present invention senses the emission conditions of two kinds of harmful components, which are included in exhaust gas exhausted from a cylinder fuel injection engine, according to the operating state, finds an energy consumption required for a plasma generating device to purify a plurality of harmful components to a predetermined reference value or less, outputs control commands so as to a voltage controller to generate the maximum energy consumption, and removes the plurality of harmful components with the minimum power consumption.

7 Claims, 3 Drawing Sheets

PLASMA EXHAUST GAS TREATMENT DEVICE

BACKGROUND OF THE INVENTION

1. Field of the Invention

The present invention relates to a plasma exhaust gas treatment device that is capable of removing exhaust gas components in exhaust gas, which is exhausted from an internal combustion engine, with the minimum electric power consumption.

2. Description of Related Art

A variety of catalyst devices have been developed to remove harmful exhaust gas components included in exhaust gas exhausted from an internal combustion engine of a vehicle. A variety of catalyst devices are known. For example, a plasma exhaust gas treatment device, which treats exhaust gas by corona-discharging (plasma), is known as a device for removing nitrogen oxide ($NO_x$) among the harmful components (Japanese Patent Provisional Publication No. 5-59934).

This plasma exhaust gas treatment device supplies power to a discharge tube, which is provided in an exhaust passage, to bring the exhaust gas into a plasma state, and decomposes the $NO_x$ in the exhaust gas into nitrogen and oxygen as harmless components. This conventional plasma exhaust gas treatment device controls the power supply according to signals indicating the quantity of gas and the concentration of $NO_x$ at an inlet of the discharge tube to thereby supply high power only when a load is high without supplying unnecessary power when the load is low. Consequently, the exhaust gas is purified according to the variations in the load of the engine.

If, however, a vehicle is used under broad driving conditions from a low speed to a high speed or from a low load to a high load; there is a substantial variation in not only the discharge of the exhaust gas but also the quantities or concentrations of various harmful components in the exhaust gas. The exhaust gas includes harmful components such as $NO_x$, hydrocarbon (HC), carbon oxide (CO), sulfur oxide, nitrogen carbide and sulfur carbide.

The power consumption decomposed by the plasma exhaust gas treatment device differs according to the kinds of the harmful components. Therefore, the conventional plasma generating device cannot sufficiently purify the exhaust gas including a plurality of harmful components.

It is therefore an object of the present invention to provide a plasma exhaust gas treatment device that is capable of purifying a plurality of exhaust gas components included in exhaust gas from an internal combustion engine with a small power consumption.

SUMMARY OF THE INVENTION

The above object can be accomplished by providing a plasma exhaust gas treatment device comprising: a plasma generating device provided in an exhaust passage of an internal combustion engine, the plasma generating device being supplied with power to generate plasma and purify exhaust gas components; power supply control means for controlling power supplied to the plasma generating device; wherein the power supply control means having exhaust gas condition sensing means for sensing and estimating the quantities or concentrations of plural exhaust gas components included in exhaust gas exhausted from the internal combustion engine; and the power supply control means finds power conditions required to purify each of the plural exhaust gas components sensed by the exhaust gas condition sensing means and determines power to be supplied to the plasma generating device according to the power conditions. Thus, the plural exhaust gas components are removed with a small power according to the driving conditions. The power supply control means can provide the plasma generating device with the power conforming to the maximum power condition among the power conditions found for the plural exhaust gas components.

More specifically, the power condition required for the plasma generating device to purify the exhaust gas is that power for acquiring the maximum energy consumption among the energy consumptions required for the plasma generating device to purify plural kinds of exhaust gas components is found and the found power is then supplied to the plasma generating device.

The plasma exhaust gas treatment device of the present invention can remove plural kinds of exhaust gas components, which vary according to the operating state of the engine, with a small power consumption. It is therefore possible to efficiently purify plural kinds of exhaust gas components while reducing the deterioration in fuel economy regardless of the quantity and conditions of the exhaust gas.

In another preferred mode of the plasma exhaust gas treatment device according to the present invention, the power supply control means has power condition calculating means for finding a power condition required for the plasma generating device to purify each of the plural exhaust gas components sensed by the exhaust gas condition sensing means to a predetermined reference value or less; and the power supply control means provides the plasma generating device with power according to a maximum power condition among the power conditions found by the power condition calculating means with respect to the plural exhaust gas components.

This plasma exhaust gas treatment device finds the power required for acquiring the maximum energy consumption among energy consumptions required for purifying a plurality of exhaust gas components to predetermined values or less, and supplies the found power to the plasma generator to thereby remove the plurality of exhaust gas components, which varies according to the operating state of the engine, to a predetermined reference value or less with the minimum power consumption.

In yet another preferred mode of the plasma exhaust gas treatment device according to the present invention, the exhaust gas condition sensing means has plural exhaust gas maps representing the quantity or concentrations of plural exhaust gas components found in advance according to an operating state of the internal combustion engine.

In yet another preferred mode of the plasma exhaust gas treatment device according to the present invention, the exhaust gas condition sensing means has a sensor for sensing the quantities or concentrations of the plural exhaust gas components.

According to this preferred mode, the exhaust gas condition sensing means may use an instantaneous value of the quantities or concentrations of the plural exhaust gas components sensed by the sensor, or may use a sensed sum value or an average sensed value of the quantities or concentrations of the plural exhaust gas components sensed by the sensor in a predetermined period of time.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

Figure 1:
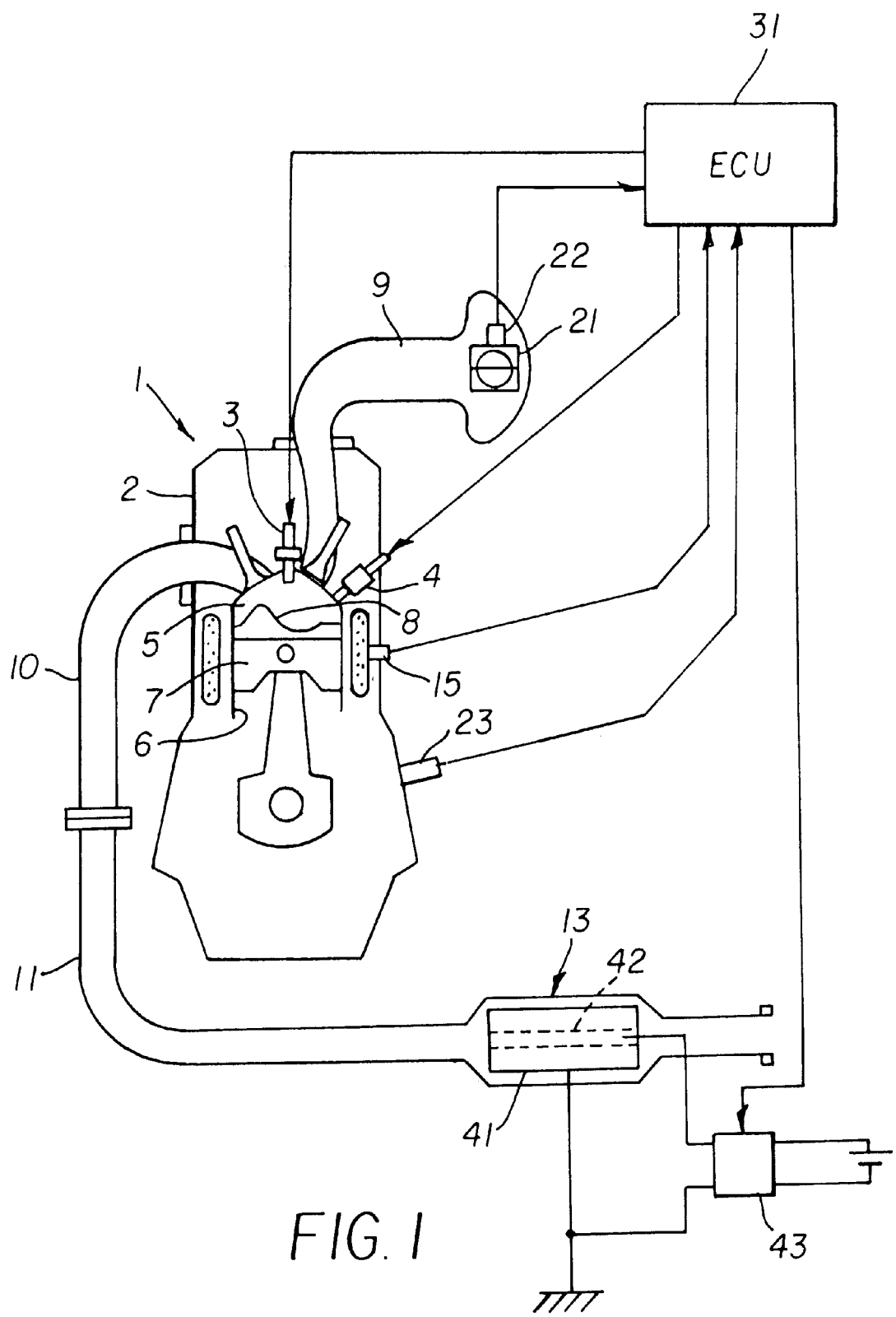
FIG. 1 is a schematic drawing showing the structure of an internal combustion engine provided with a plasma exhaust gas treatment device according to an embodiment of the present invention.

A preferred embodiment of the present invention will be described hereinbelow with reference to the accompanying drawings. A spark ignition multiple cylinder fuel injection type internal combustion engine, which injects fuel directly into a combustion chamber, is given as an example in the the embodiment shown in the drawings.

Figure 2:
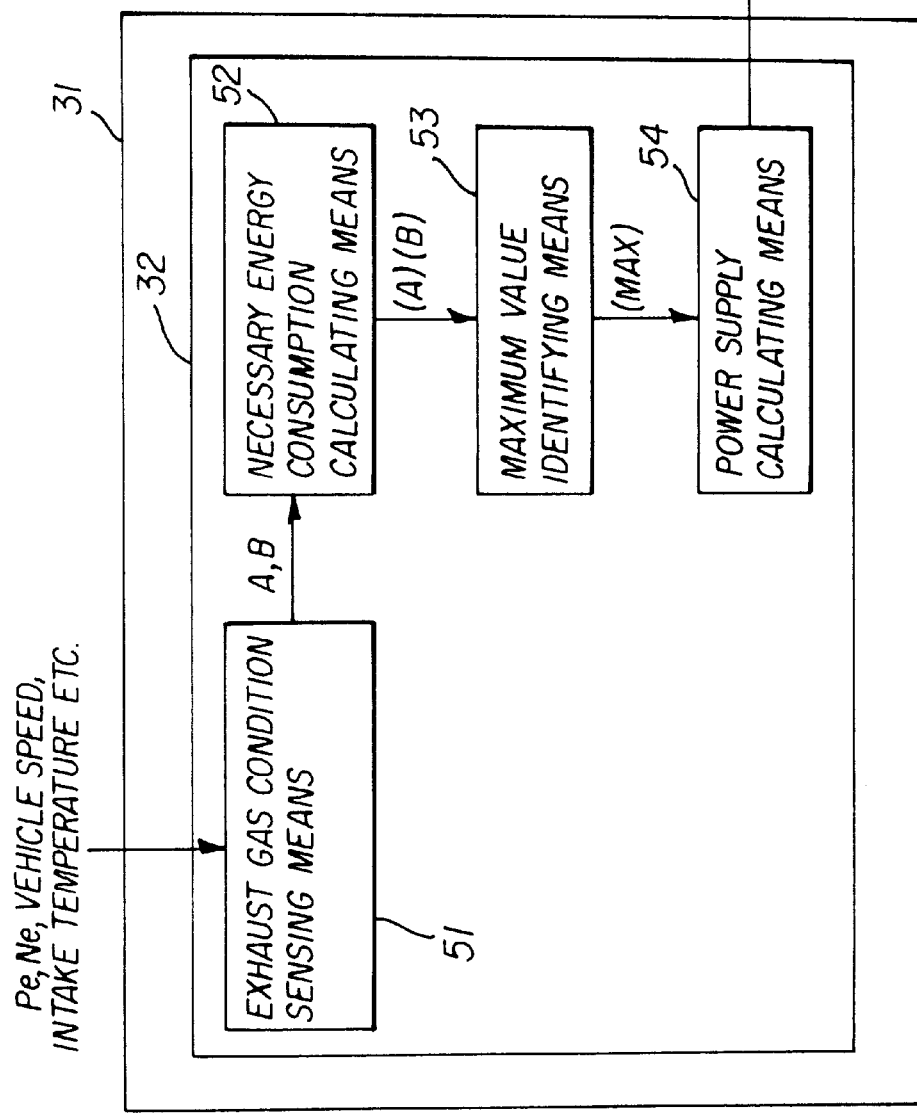
FIG. 2 is a block diagram showing the structure of a power supply control means.
Figure 3:
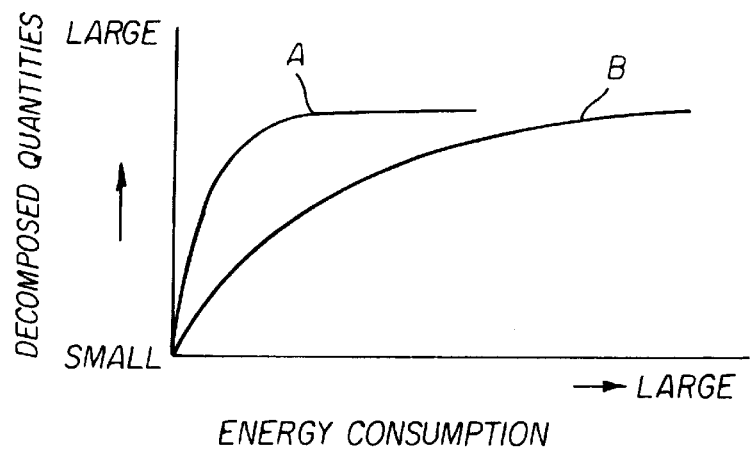
FIG. 3 is a graph showing a relationship between the decomposed quantities of harmful components and energy consumption in a plasma generating device.
Figure 4:
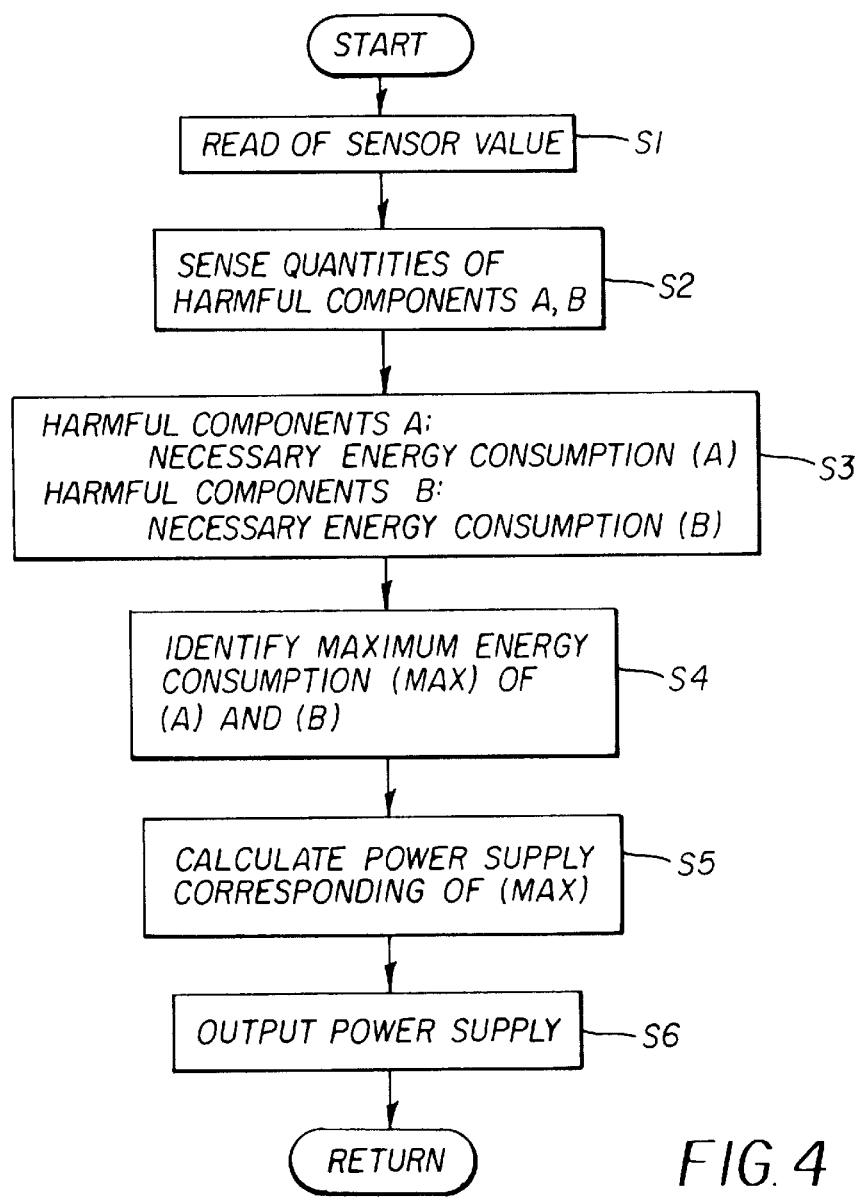
FIG. 4 is a flow chart showing the procedure for controlling the supply of power.

FIG. 1 is a schematic block diagram showing an internal combustion engine provided with a plasma exhaust gas treatment device according to an embodiment of the present invention. FIG. 2 is a block diagram showing the structure of a power supply control means. FIG. 3 shows a relationship between the decomposed quantities of harmful components and energy consumption in a plasma generating device. FIG. 4 is a flow chart showing the procedure for controlling the supply of power.

As shown in FIG. 1, an ignition plug 3 is attached to a cylinder head 2 of each cylinder in a cylinder fuel injection engine 1. An electromagnetic injection valve 4 is attached to each cylinder of the engine 1. An injection hole of the fuel injection valve 4 is opened in a combustion chamber 5. Fuel injected from the fuel injection valve 4 is directly injected into the combustion chamber 5. A piston 7 is supported by a cylinder 6 of the cylinder fuel injection engine 1 in such a manner that the piston 7 is slidable vertically. A hemispherical cavity 8 is formed at the top of the piston 7. The cylinder fuel injection engine 1 generates a reverse tumble flow in a clockwise direction in FIG. 1 by a later-described upright intake port and the cavity 8.

The intake port, which extends in substantially an upright direction, is formed at the cylinder head 2 of each cylinder. One end of each intake manifold 9 connects to the top face of the cylinder head 2 in such a manner as to communicate with the top end of each intake port. A drive-by-wire (DBW) electronic throttle valve (hereinafter referred to as ETV) connects to the other end of the intake manifold 9. The ETV 21 is provided with a throttle position sensor 22, which senses a throttle opening θth. The cylinder fuel injection engine 1 is provided with a crank angle sensor 23, which senses a crank angle. The crank angle sensor 23 is capable of sensing an engine revolution speed Ne. The cylinder fuel injection engine 1 is also provided with a coolant temperature sensor 15, which senses the temperature of cooling water.

An exhaust port, which extends in substantially a horizontal direction from the combustion chamber 5, is formed in the cylinder head 2 of each cylinder. One end of an exhaust manifold 10 connects to the side of the cylinder head, at which the exhaust pot of the cylinder head 2 is opened, in such a manner as to communicate with each exhaust port. The exhaust manifold 10 is provided with an EGR device (not shown) having an EGR passage, which connects the exhaust manifold 10 with the intake manifold 9. On the other hand, an exhaust pipe 11 connects to the other end of the exhaust manifold 10. A plasma generating device 13 for removing a plurality of exhaust gas components (harmful components) in exhaust gas is mounted in the exhaust pipe 11, and a muffler (not shown) is connected to the exhaust pipe 11 through the plasma generating device 13.

A vehicle is provided with an electronic control unit (hereinafter referred to as ECU) 31. The ECU 31 has an input/output device; a storage device for containing control programs, control maps and the like; a central processing unit; timers; counters; and so forth.

The ECU 31 totally controls the plasma generating system of the present embodiment including the cylinder fuel injection engine 1. The ECU 31 receives the sensed information from a variety of sensors such as the throttle position sensor 22, the crank angle sensor 23, the coolant temperature sensor, a vehicle speed sensor, an intake temperature sensor and an O2 sensor. According to the sensed information from these sensors, the ECU 31 determines a fuel injection mode, a fuel injection amount, an ignition timing and the like; and drives the fuel injection valve 4, the ignition plug 3 and the like.

The ECU 31 finds an engine load Pe according to the throttle opening θth sensed by the throttle position sensor 22, the engine revolution speed Ne sensed by the crank angle sensor 23 and the water temperature sensed by the coolant temperature sensor. The fuel injection mode is determined with reference to a map (not shown) according to the load Pe and the engine revolution speed Ne (fuel injection mode setting means). If both the load Pe and the engine revolution speed Ne are low, the fuel injection mode setting means sets a compression stroke injection mode as the fuel injection mode. On the other hand, if the load Pe or the engine revolution speed Ne is high, the fuel injection mode setting means sets an intake stroke injection mode as the fuel injection mode. A target air-fuel ratio (target A/F) as a control objective in each fuel injection mode is determined according to the load Pe and the engine revolution speed Ne. A proper fuel injection amount is determined according to the target A/F.

In the cylinder fuel injection engine 1 thus constructed, the previously-mentioned reverse tumble flow is generated when the intake air flows into the combustion chamber through the intake port from the intake manifold 9. If the compression stroke injection mode is set as the fuel injection mode, the cylinder fuel injection engine 1 starts injecting the fuel at the middle stage of the compression stroke. By using the above-mentioned reverse tumble flow, the cylinder fuel injection engine 1 can collect a small amount of fuel only in proximity to the ignition plug 3 disposed at the center of the top of the combustion chamber 5 and make the air-fuel ratio extremely lean in an area apart from the ignition plug 3. In the compression stroke injection mode, the air-fuel ratio is made stoichiometrical or rich only in proximity to the ignition plug 3 in the combustion chamber 5 to thereby realize a stable stratified burn (stratified super lean burn) and reduce the fuel consumption.

To acquire a high output from the cylinder fuel injection engine 1 as in the intake stroke injection mode, the fuel is injected in the intake stroke to form a uniform mixture all over the entire combustion chamber 5. In the intake stroke injection mode, the cylinder fuel injection engine 1 performs a premixed combustion by bringing the interior of the combustion chamber 5 into the state of containing a stoichiometrical or lean mixture. Of course, the stoichiometrical or rich air-fuel ratio achieves a higher output than the lean air-fuel ratio, and therefore, the fuel is injected in such a timing as to sufficiently atomize and vaporize the fuel in order to efficiently acquire the high output.

There will now be described the plasma generating device 13 with reference to FIGS. 1 and 2.

As shown in FIG. 1, a ground electrode 42 is arranged in a discharge tube 41 of the plasma generating device 13. A voltage controller 43 controls the supply of power to the discharge tube 41 and the ground electrode 42. Consequently, a voltage is applied between the discharge tube 41 and the ground electrode 42. The application of the voltage between the discharge tube 41 and the ground electrode 42 brings the exhaust gas passing through the discharge tube 41 into a plasmatic state, and decomposes a plurality of harmful components in the exhaust gas into harmless components.

Under the control of the voltage controller 43, the plasma generating device 13 is supplied with power corresponding to an energy consumption required for the plasma generating device 13 to remove the harmful components.

The quantity of exhaust gas and the conditions of the harmful components, i.e., the kinds and quantities of harmful components in the exhaust gas vary according to the operating state of the engine. More specifically, the kinds and quantities of harmful components such as nitrogen oxide ($NO_x$), carbon oxide (CO), sulfur oxide ($SO_x$), hydrogen sulfide ($H_2S$), ammonia ($NH_3$), nitrogen oxide and sulfur carbide vary according to the operating state of the engine. The energy consumption required for the plasma generating device 13 to decompose the harmful components vary according to the kinds and quantities of harmful components.

Accordingly, the ECU 31 of the present embodiment has a power supply control means 32 for controlling the power to be supplied to the plasma generating device 13. The power supply control means 32 has an exhaust gas condition sensing means 51. The power supply control means 32 has a function of finding an energy consumption, which is required for the plasma generating device 13 to purify the harmful components to a predetermined reference value or less, for each harmful component according to the conditions sensed by the exhaust gas condition sensing means 51. The power supply control means 32 also has a function of finding power required for generating the maximum energy consumption among the energy consumptions found for the harmful components, and outputting commands to the voltage controller 43 so that the power required for the maximum consumption energy can be supplied to the plasma generating device 13.

There will be described the structure of the power supply control means in the ECU. 31 with reference to the block diagram of FIG. 2.

The power supply control means 32 has the exhaust gas condition sensing means 51. The exhaust gas condition sensing means 51 receives information such as a load Pe, an engine revolution speed Ne, a vehicle speed and an intake temperature. The exhaust gas condition sensing means 51 determines the property of the harmful components according to the operating state found from the received information. The exhaust gas condition sensing means 51 has maps representing the quantities or concentrations of two kinds of harmful components A, B in the exhaust gas determined according to the operating state. The exhaust gas condition sensing means 51 estimates the property of the harmful components with reference to the maps according to the operating state. For example, the exhaust gas condition sensing means 51 has a map A ($NO_x$) and a map B (THC) (not shown) as the maps for use in the estimation of the harmful components. Thus, the exhaust gas condition sensing means 51 can sense the quantities of the harmful components A, B according to the operating state. The information about the harmful components A, B sensed by the exhaust gas condition sensing means 51 is inputted to a necessary energy consumption calculating means 52.

There must be at least two kinds of harmful components to be sensed. It is possible to sense CO, $SO_x$, $H_2S$, $NH_3$, $N_2O$ and the like as well as the above-mentioned two kinds of harmful components. In order to sense the conditions of the exhaust gas, it is possible to measure or assume the kinds and quantities of harmful components in the exhaust gas by using an exhaust gas sensor. As parameters for controlling the plasma generating device 13, it is possible to apply the instantaneous values of kinds and quantities of harmful components or apply the sensed sum value or the average sensed value in a predetermined period (e.g., a driving distance and a predetermined fuel consumption period).

The necessary energy consumption calculating means 52 (power condition calculating means) contains information about a relationship between the decomposed quantities of the harmful components A, B and the energy consumption in the plasma generating device 13 (see FIG. 3) and information about the permissible discharge amount of the harmful components restricted by areas and the like. The necessary energy consumption calculating means 52 individually calculates the quantities of the harmful components A, B in order for the plasma generating device 13 to decompose the harmful components A, B. More specifically, the necessary energy consumption calculating means 52 individually calculates the energy consumptions {A}, {B} required for the plasma generating device 13 to decompose the harmful components A, B in the existing exhaust gas to the permissible discharge amount (predetermined reference values).

To calculate the energy consumptions {A}, {B}, the necessary decomposed quantities ΔA, ΔB of the harmful components are calculated first, and the energy consumptions {A}, {B} are then found with reference to the graph of FIG. 3 by using the calculated necessary decomposed quantities ΔA, ΔB.

The necessary decomposed quantities ΔA, ΔB are found respectively according to the following expression:1-(predetermined value/discharge amount).

The necessary decomposed quantities ΔA, ΔB may also be respectively calculated by the following expression: predetermined value/discharge amount or discharge amount-predetermined value.

In this case, the predetermined values are prestored as a map of driving conditions (e.g., the load Pe, the engine revolution speed Ne, the vehicle speed, the harmful exhaust gas value, the exhaust A/F, the water temperature, and the intake temperature).

The energy consumptions {A}, {B} calculated by the necessary energy consumption calculating means 52 are inputted to a maximum value identifying means 53. The maximum value identifying means 53 identifies the maximum value {max} of the energy consumption, which is identified by the maximum value identifying means 53, is inputted to a power supply calculating means 54. The power supply calculating means 54 calculates a power supply required for the maximum value { max} of the energy consumption. The power supply calculating means 54 also outputs control commands to the voltage controller 43 so that the calculated necessary power supply can be supplied to the plasma generating device 13.

The power supply calculating means 54 can control the power supply through the voltage controller 43 according to the maximum value {max} of the energy consumptions to the plasma generating device 13 in several control methods. In one method, the power supply is on-off controlled by switching. In another method, the power supply is controlled by at least one of proportion, integration and differentiation with a response delay being taken into consideration. In yet another method, the power supply is controlled by comparison using models of the exhaust gas component purification by plasma. These methods may be combined all together.

There will now be described the operation of the plasma exhaust gas treatment device with reference to FIG. 4.

A variety of sensor values is read into the exhaust gas condition sensing means 51 in step S1, and the quantities of two harmful components A, B is sensed with reference to these two kinds of harmful components A, B in step S2. The necessary energy consumption calculating means 52 calculates the energy consumptions {A}, {B} in step S3. The maximum value identifying means 53 identifies the maximum energy consumption {max} of the energy consumptions {A}, {B} in step S4. The power supply calculating means 54 calculates power required for the identified maximum value {max} of the energy consumptions in step S5, and outputs control commands to the voltage controller 43 so that the calculated power can be supplied to the plasma generating device 13 in step S6.

The above-described plasma exhaust gas treatment device senses the discharge conditions of the two kinds of harmful components included in the exhaust gas from the cylinder fuel injection engine 1, and finds the respective energy consumptions required for the plasma generating device 13 to purify the two kinds of harmful components to a predetermined reference value or less. The plasma exhaust gas treatment device outputs the control commands to the voltage controller 43 so that the power corresponding to the maximum value of the energy consumption can be supplied to the plasma generating device 14. Thus, the plasma exhaust gas treatment device can remove two kinds of harmful components with the minimum energy consumption according to the operating state.

It is therefore possible to efficiently purify at least two kinds of harmful components while reducing the deterioration in the fuel economy regardless of the discharge state of the exhaust gas.

In the above-described embodiment, the spark ignition engine, which directly injects the fuel into the combustion chamber, is given as an example of the plasma exhaust gas treatment device. The present invention, however, may also be applied to diesel engine and a spark ignition engine, which injects the fuel into an intake tube to put a mixture into a combustion chamber. In the above-described embodiment, the energy consumptions are calculated according to the quantities of the exhaust gas components, but the energy consumptions may also be calculated according to the concentration of the exhaust gas components. In the above-described embodiment, the power corresponding to the larger energy consumption between the energy consumptions for the two kinds of harmful components in order to purify the two kinds of harmful components to a predetermined reference value. Alternatively, the power to be supplied to the plasma generating device according to the set reference value and the kinds and number of harmful components may be selected or calculated from the energy consumptions found correspondingly to the harmful components.

What is claimed is:

1. A plasma exhaust gas treatment device comprising:
    a plasma generating device provided in an exhaust passage of an internal combustion engine, said plasma generating device being supplied with power to generate plasma and purify plural exhaust gas components, including $NO_x$, and at least one of THC, CO, $SO_x$, $H_2S$, $NH_3$, and $N_2O$; and
    power supply control means for controlling power supplied to said plasma generating device;
    wherein said power supply control means includes exhaust gas condition sensing means for sensing and estimating quantities or concentrations of plural exhaust gas components included in exhaust gas exhausted from said internal combustion engine; and
    said power supply control means finds power conditions required to purify each of said plural exhaust gas components sensed by said exhaust gas condition sensing means and determines power to be supplied to said plasma generating device according to the power conditions.

2. A plasma exhaust gas treatment device according to claim 1, wherein:
    said power supply control means provides said plasma generating device with power according to a maximum power condition among power conditions found for plural exhaust gas components.

3. A plasma exhaust gas treatment device according to claim 1, wherein:
    said power supply control means includes power condition calculating means for finding a power condition required for said plasma generating device to purify each of said plural exhaust gas components sensed by said exhaust gas condition sensing means to a predetermined reference value or less; and
    said power supply control means provides said plasma generating device with power according to a maximum power condition among the power conditions found by said power condition calculating means with respect to said plural exhaust gas components.

4. A plasma exhaust gas treatment device according to claim 1, wherein:
    said exhaust gas condition sensing means includes plural exhaust gas maps representing quantities or concentrations of plural exhaust gas components found in advance according to an operating state of said internal combustion engine.

5. A plasma exhaust gas treatment device according to claim 1, wherein:
    said exhaust gas condition sensing means includes a sensor for sensing quantities or concentrations of said plural exhaust gas components.

6. A plasma exhaust gas treatment device according to claim 5, wherein:
    said exhaust gas condition sensing means uses an instantaneous value of the quantities or concentrations of said plural exhaust gas components sensed by said sensor.

7. A plasma exhaust gas treatment device according to claim 5, wherein:
    said exhaust gas condition sensing means uses a sensed sum value or an average sensed value of the quantities or concentrations of said plural exhaust gas components sensed by said sensor in a predetermined period of time.

* * * * *